(12) United States Patent
Herren

(10) Patent No.: US 7,258,228 B1
(45) Date of Patent: Aug. 21, 2007

(54) CLAMP SYSTEM FOR CONVEYOR BELT SKIRTBOARDS

(76) Inventor: Harold L. Herren, P.O. Box 28, Platteville, CO (US) 80651

( * ) Notice: Subject to any disclaimer, the term of this patent is extended or adjusted under 35 U.S.C. 154(b) by 0 days.

(21) Appl. No.: 11/397,788

(22) Filed: Apr. 3, 2006

(51) Int. Cl.
| | |
|---|---|
| *B65G 15/00* | (2006.01) |
| *B65G 17/00* | (2006.01) |
| *B65G 21/20* | (2006.01) |
| *B65G 39/18* | (2006.01) |
| *A47B 96/06* | (2006.01) |
| *E04G 5/06* | (2006.01) |

(52) U.S. Cl. ............................ 198/836.3; 248/231.85; 198/836.1

(58) Field of Classification Search ............. 198/836.3, 198/836.1, 836.2, 836.4; 248/230.1, 295.11, 248/231.85, 300
See application file for complete search history.

(56) References Cited

U.S. PATENT DOCUMENTS

| | | | | |
|---|---|---|---|---|
| 5,154,280 A | * | 10/1992 | Mott ........................ | 198/525 |
| 5,267,642 A | * | 12/1993 | Gharpurey et al. ...... | 198/836.1 |
| 5,774,951 A | * | 7/1998 | Close et al. ................... | 24/568 |
| 5,913,404 A | * | 6/1999 | Bowman .................. | 198/836.1 |
| 6,547,062 B2 | * | 4/2003 | Wiggins ................... | 198/836.1 |
| 6,763,935 B2 | * | 7/2004 | Ostman .................... | 198/836.1 |
| 2002/0063043 A1 | * | 5/2002 | Herren ..................... | 198/836.3 |

FOREIGN PATENT DOCUMENTS

GB 2087337 A * 5/1982

* cited by examiner

*Primary Examiner*—Gene O. Crawford
*Assistant Examiner*—Ramya G. Prakasam
(74) *Attorney, Agent, or Firm*—William E. Hein

(57) ABSTRACT

A compact clamp system for use with conveyor belt rubber skirtboards utilizes a minimum number of parts and is easy to adjust, even if positioned in areas that are difficult to access. A base member is attached to the steel support plate of a conventional conveyor. A stationary support member having a downwardly extending leg is fixedly attached to the base member, and a depending pressure bar assembly is hingedly attached to the support member. A wedge pin assembly including one or more wedge pins is fixedly attached to the downwardly extending leg of the support member to apply an inward force to the pressure bar assembly to thereby urge it against the conveyor belt skirtboard and to release that force to facilitate repositioning of the rubber skirtboard to accommodate wear, for example.

3 Claims, 4 Drawing Sheets

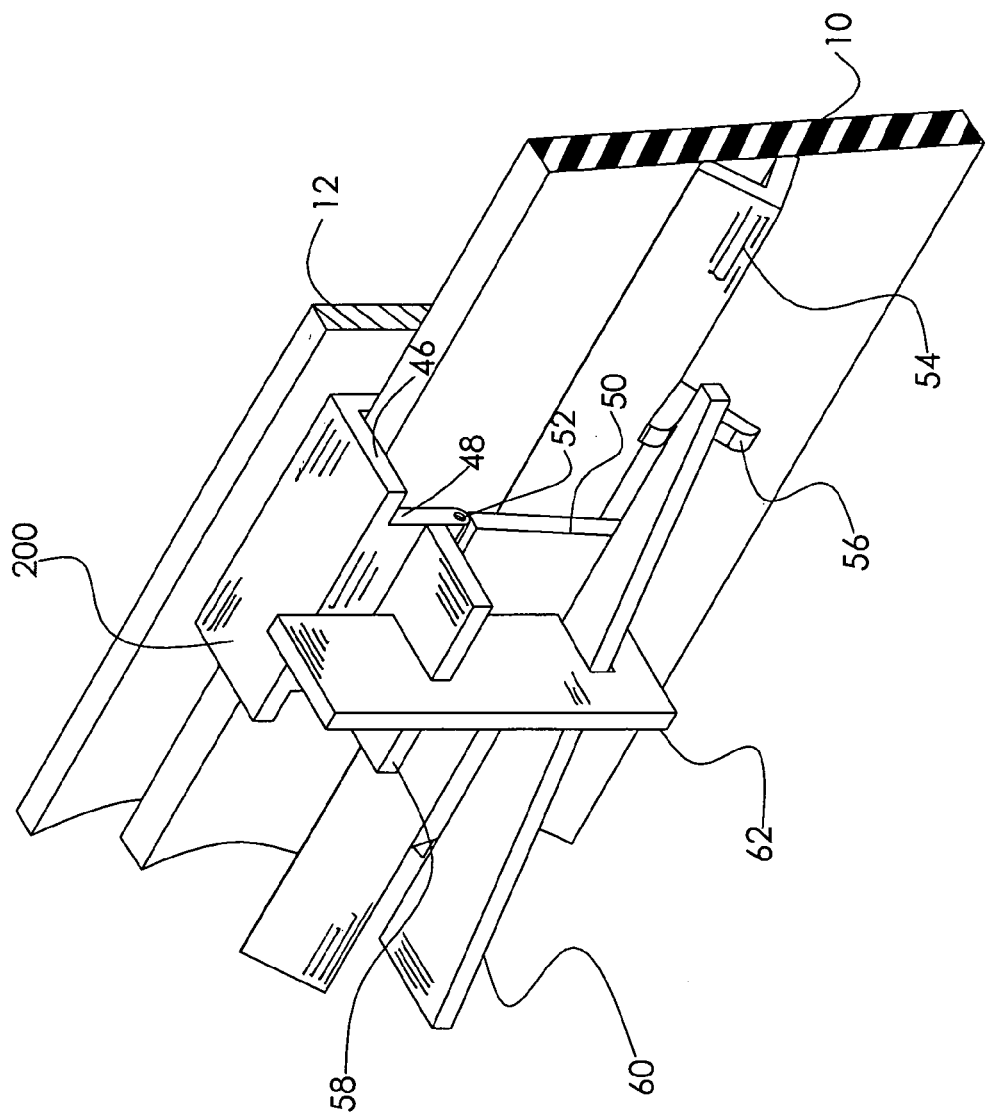

CLAMP SYSTEM FOR CONVEYOR BELT SKIRTBOARDS

BACKGROUND AND SUMMARY OF THE INVENTION

This invention relates generally to conveyor belt systems for moving granular material such as sand, gravel, crushed rock, etc., and, more particularly, to skirtboards for use in retaining such granular material on a conveyor belt.

Conveyor belts are commonly used for transporting a variety of granular materials. These belts are typically constructed of a rubber material, and they move over numerous supporting rollers. The side edges of such conveyor belts may be tilted or cupped slightly upwardly, but it is still necessary to provide rubber skirtboards at the side edges of these belts in order to prevent the granular material conveyed thereon from spilling off the side of the belt.

These skirtboards must be made of a rubber material because the bottom edge of each skirtboard is in contact with the upper surface of the belt to provide a positive seal between the skirtboard and the belt. A metal or wooden skirtboard would damage the conveyor belt as it moves relative to the stationary skirtboards.

The skirtboards are supported by the conveyor steel frame or skirt plate, which extends downwardly to within several inches of the conveyor belt. It is important to avoid contact between the steel skirt plates and the belt in order to prevent damage to the belt.

The rubber skirtboards are typically constructed of softer rubber than that of the rubber conveyor belts themselves. Thus, the lower edges of the skirtboards contact the upper surface of the conveyor belt and are permitted to wear away without damaging the conveyor belt itself.

The skirtboard is typically provided in widths of about 4 to 10 inches and in thicknesses of 5/16-inch to more than one inch. It is also typically provided in 50-foot rolls, which can be cut to a desired length.

A skirtboard clamp is used to attach the upper portion of the skirtboard to the skirt plate and to apply pressure to the outside of the skirtboard in opposition to the pressure of the material being conveyed on the belt. As the lower edge of the skirtboard wears away, the clamps must be loosened to enable the skirtboard to be lowered to be closer to the conveyor belt.

Various types of conveyor belt skirtboard clamp systems are known in the prior art, representative of which are those described in U.S. Pat. Nos. 3,989,137, 4,204,595, 4,436,446, 5,048,669, 5,154,280, and 5,267,642. These prior art systems are in various respects cumbersome, difficult to use, and ineffective in applying the required pressure to the outer surface of the skirtboard. For example, many prior art clamping systems are of flimsy construction and utilize a number of components. Since the areas of a conveyor requiring the use of skirtboard rubber are generally dusty, dirty, wet, and difficult to access, the bolt and nut tightening systems employed in many skirtboard clamp systems are susceptible to rusting and thread-plugging, making their required periodic adjustment inconvenient and time consuming.

It would therefore be advantageous to provide a compact clamp system for use with conveyor belt skirtboards that utilizes a minimum number of parts and that is easy to adjust, even if positioned in areas that are difficult to access. In accordance with two illustrated embodiments of the present invention, a base member is attached to the steel support plate of a conventional conveyor. A stationary support member having a downwardly extending leg is fixedly attached to the base member, and a depending pressure bar assembly is hingedly attached to the support member. A wedge pin assembly is fixedly attached to the downwardly extending leg of the support member to releasably apply an inward force to the pressure bar assembly to urge it against a conveyor belt skirtboard.

BRIEF DESCRIPTION OF THE DRAWINGS

FIG. 4 is a diagram of the clamp system of FIG. 3 illustrating the wedge pin is illustrated in its fully inserted position.

DETAILED DESCRIPTION OF THE INVENTION

Figure 1:
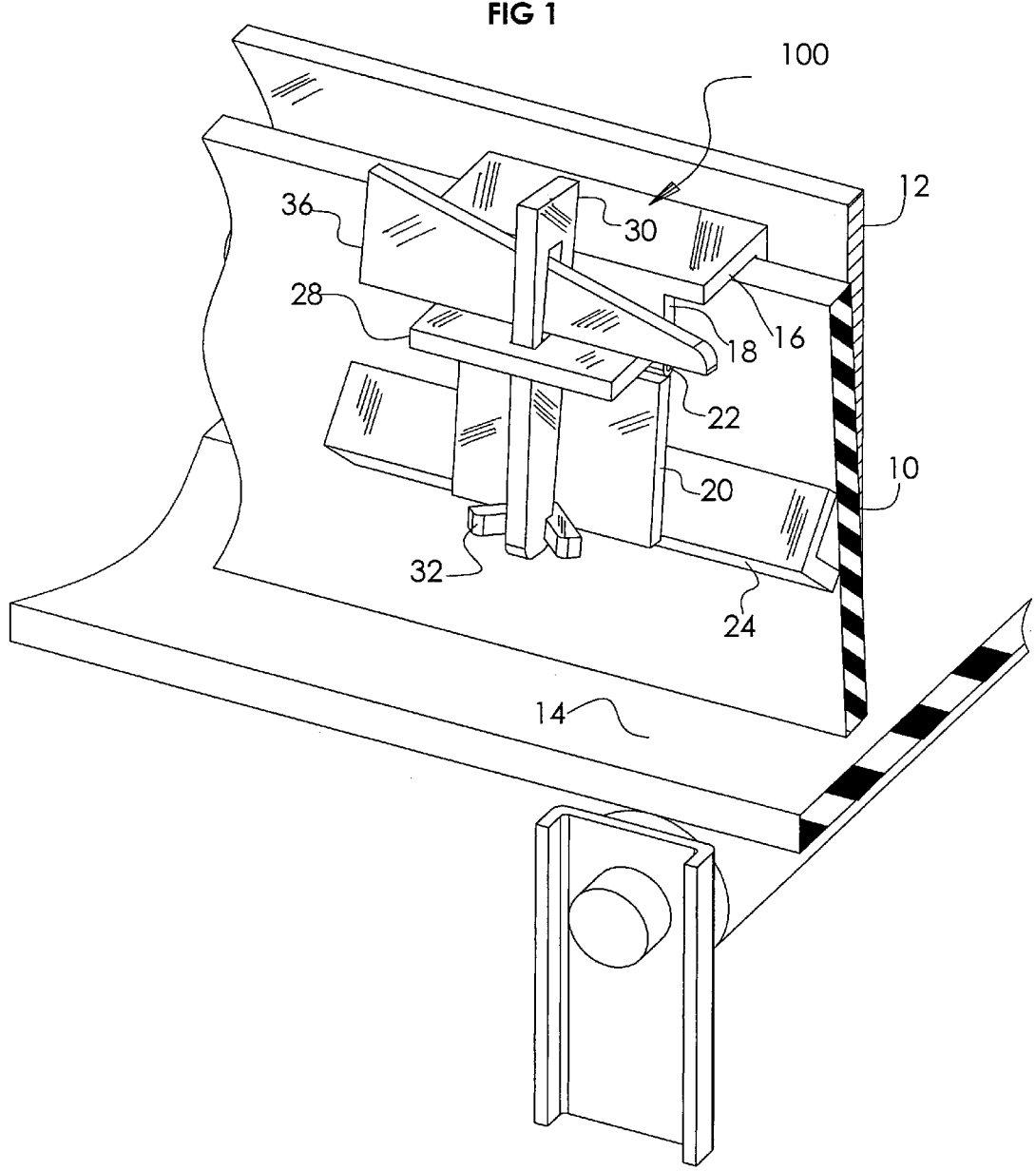
FIG. 1 is a perspective view of a clamp system for conveyor belt skirtboards constructed in accordance with a first embodiment of the present invention.
Figure 2:
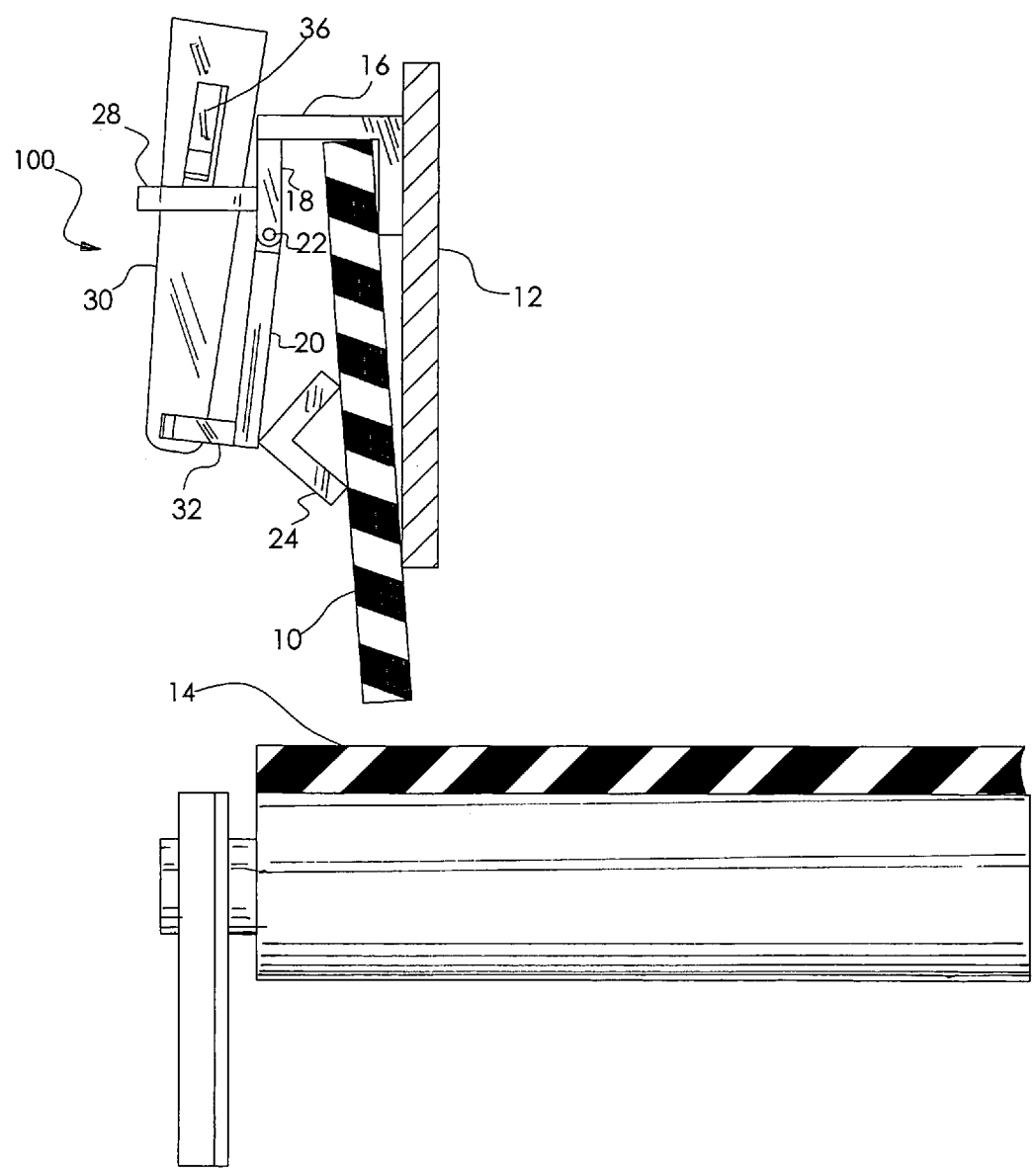
FIG. 2 is a right side view of the clamp system for conveyor belt skirtboards of FIG. 1.

Referring now to FIG. 1, there is shown a pictorial diagram of a skirtboard clamp system 100 for conveyor belts that is constructed in accordance with a first embodiment of the present invention. A conventional rubber skirtboard 10 is typically clamped to a conventional steel skirt plate 12 that is fixedly provided adjacent each side of a conventional rubber conveyor belt 14. Conveyor belt 14 is typically employed to convey loose granular material from one location to another. Skirtboard 10 is clamped into a position against skirt plate 12 so as to extend below skirt plate 12 in close proximity to, but not touching, the conveyor belt 14. Skirtboard 10 prevents the loose granular material typically conveyed on conveyor belt 14 from falling off the side thereof.

Each of the clamp systems 100 includes a base member 16 that is welded or otherwise attached to steel skirt plate 12 of a conventional material conveyor apparatus. Base member 16 extends outwardly from skirt plate 12 and skirtboard 10. Base member 16 is formed to include a downwardly extending support leg 18 to which a depending pressure bar assembly 20 is hingedly attached by means of a hinge 22. Hinge 22 preferably extends continuously along the full length of clamp system 100. A pressure bar 24, illustrated to be v-shaped, is provided at the lower end of pressure bar assembly 20. Pressure bar 24 is positioned to face inwardly so that its v-shaped legs can be urged against skirtboard 10 at points proximate the lower end of skirt plate 12 to thereby securely clamp skirtboard 10 in a desired position in place against skirt plate 12.

A channel 26 is defined between base member 16 and skirt plate 12. Rubber skirtboard 10, of any desired thickness, may therefore be positioned adjacent to and generally parallel to skirt plate 12. Support leg 18 extends downwardly from base member 16 and is generally parallel to skirt plate 12.

A wedge pin assembly of skirtboard clamp system 100 includes a tensioning wedge pin holder 28 that is fixedly provided proximate the lower end of support leg 18 of base member 16 so as to extend outwardly therefrom. Wedge pin holder 28 includes a rectangular opening therein for retaining a tightening wedge pin 30. A lower end of wedge pin 30 engages an outwardly-facing v-shaped retainer 32 fixedly provided at the lower end of pressure bar assembly 20.

A force applied by a hammer blow, for example, to the top end of wedge pin 30 serves to drive it downwardly and against retainer 32 to thereby urge pressure bar assembly 20 and pressure bar 24 thereof against skirtboard 10. As a result, the present clamp system 100 maintains the skirtboard 10 in a tight position projecting downwardly from skirt plate 12. Since rubber skirtboard 10 may be repositioned with wear, as desired, it can be nearly completely consumed before being discarded. The hinged design of the clamp system 100 allows maximum pressure to be applied to pressure bar 24 at the lowest possible area on skirt plate 12. Prior art skirtboard clamp systems that apply pressure near or at the upper edge of the rubber skirtboard 10 are not as effective in retaining skirtboard 10 in a tightly secured position.

In order to relieve the force of pressure bar 24 against skirtboard 10, wedge pin 30 must be driven upwardly. Due to the proximity of the lower end of wedge pin 30 to the typical conveyor belt 14, it may be difficult to apply the required hammer blow(s) to the lower end of wedge pin 30 in order to accomplish this result. Thus, a vertically-oriented rectangular opening is provided in wedge pin 30 above wedge pin holder 28, through which a horizontally-oriented loosening wedge pin 36 may be inserted. Once inserted, wedge pin 36 may be driven by one or more hammer blows, for example, applied against the blunt end thereof to thereby force wedge pin 30 upwardly.

Figure 3:
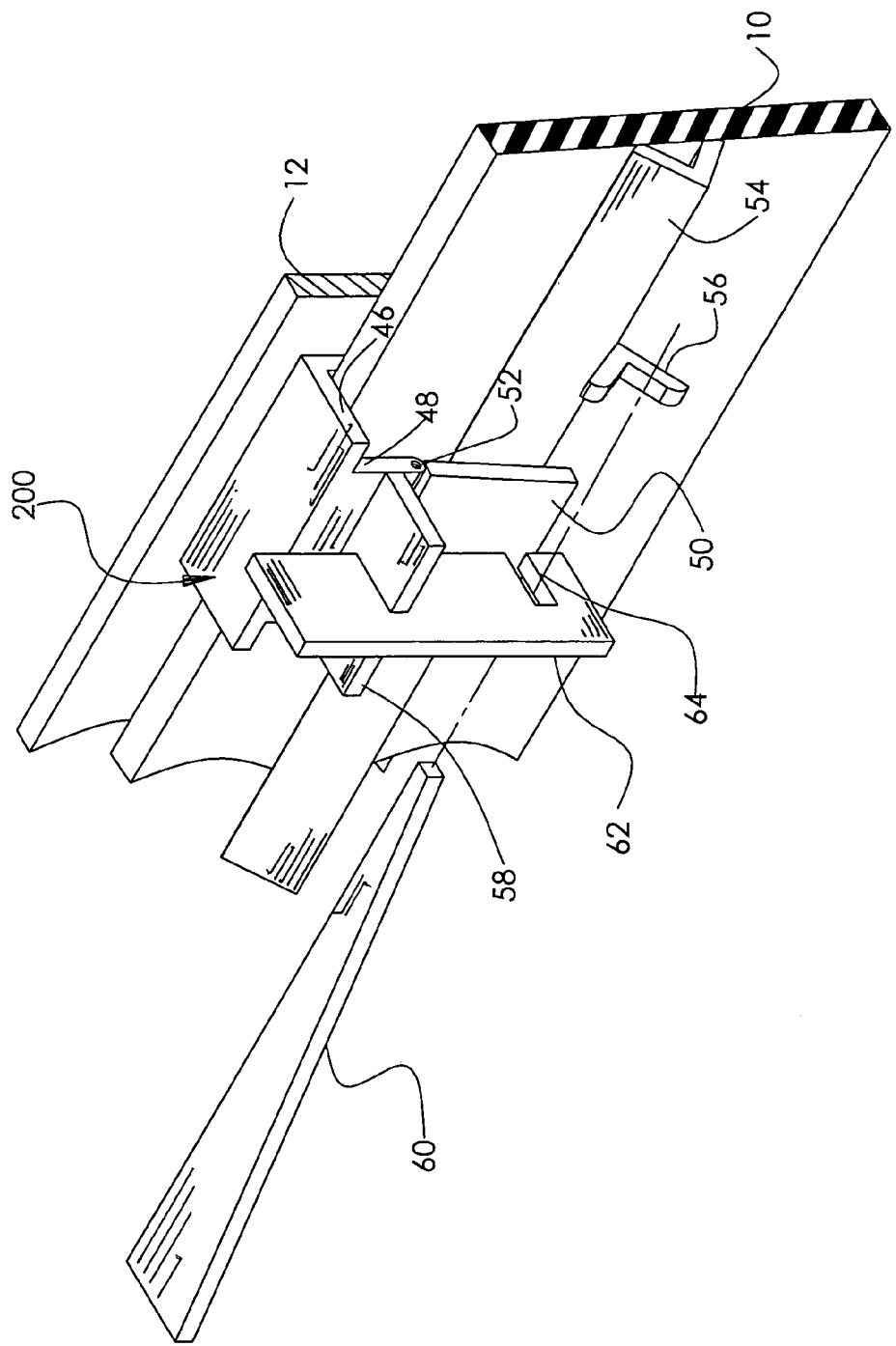
FIG. 3 is a perspective view of a clamp system for conveyor belt skirtboards constructed in accordance with a second embodiment of the present invention, illustrating a wedge pin in its uninserted position.

Referring now to FIGS. 3 and 4, there is shown a pictorial diagram of a skirtboard clamp system 200 that is constructed in accordance with a second embodiment of the present invention. A base member 46 is typically welded to steel skirt plate of a conventional material conveyor apparatus. Base member 46 extends outwardly from skirt plate 12 and skirtboard 10. Base member 46 is formed to include a downwardly extending support leg 48, generally parallel to skirt plate 12, to which a depending pressure bar assembly 50 is hingedly attached by means of a hinge 52. A pressure bar 54, illustrated to be v-shaped, is provided at the lower end of pressure bar assembly 50. Pressure bar 24 is positioned to face inwardly so that its v-shaped legs can be urged against skirtboard 10 that is positioned as desired against skirt plate 12 to thereby securely clamp skirtboard 10 against skirt plate 12.

A wedge pin assembly of skirtboard clamp system 200 includes a tensioning wedge pin holder 62 that is fixedly provided proximate the lower end of support leg 48 so as to extend perpendicularly and outwardly therefrom. Wedge pin holder 62 includes a rectangular opening 64 therein for retaining a wedge pin 60. Wedge pin 60 is illustrated in FIG. 3 in position for being inserted into rectangular opening 64 and in FIG. 4 in its fully inserted position. A leading, more pointed end of wedge pin 60 engages an outwardly-facing v-shaped retainer 56 fixedly attached to pressure bar 54.

A hammer blow, for example, applied to the blunt end of wedge pin 60, serves to drive it longitudinally forward against retainer 56 to thereby urge pressure bar assembly 50 and, consequently, pressure bar 54 thereof against skirtboard 10. In order to relieve the force of pressure bar 54 against skirtboard 10, wedge pin 60 is driven rearwardly, typically by delivering a hammer blow against the pointed end of wedge 60. Clamp system 200 is advantageous in that wedge pin 60 is more accessible in its horizontal position alongside skirtboard 10 for receiving hammer blows to both ends thereof.

Typically, several of the clamp systems 100 or 200 of the present invention are positioned along skirt plate 12 that is conventionally provided proximate each side of conventional conveyor belt 14. Each of the clamp systems 100, 200 may be positioned in close proximity to each other, or they may be spaced apart, as desired. In addition, each of the clamp systems 100, 200 may be of any desired length. The height of the skirt plate 12 may vary. Typically, that height is 6-8 inches or more so that skirtboards 10 of varying height may be readily accommodated by clamp system 100. Each of the clamp systems 100, 200 provides sufficient clearance to accommodate skirtboards 10 having a thickness of approximately 3/16-inch to one inch and having a width of approximately 4-12 inches.

I claim:

1. A clamp system for use in conveyor belt systems utilizing a removable, resilient skirtboard clamped against a downwardly extending support plate, the skirtboard forming a barrier against the passage of conveyed material off each side edge of a moving conveyor belt, the clamp system comprising:

a base member attached to said support plate, the base member extending away from said support plate and having a downwardly extending leg member;

a pressure bar assembly depending from said leg member and hingedly attached thereto, said pressure bar assembly comprising a pressure bar attached at a lower end thereof for contacting said skirtboard proximate a lower edge of said support plate to thereby securely clamp said skirtboard in a desired position against said support plate, said pressure bar assembly further comprising a wedge pin assembly including a tightening wedge pin holder fixedly attached to and extending away from said base member, said wedge pin holder having a rectangular opening therein, said wedge pin assembly further comprising a tightening wedge pin vertically positioned within said opening in said wedge pin holder for engaging said pressure bar at a lower end thereof when said tightening wedge pin is driven downwardly; said tightening wedge pin including a vertically-oriented rectangular opening therein above said tightening wedge pin holder; and said wedge pin assembly further comprising a loosening wedge pin horizontally positioned within said opening in said tightening wedge pin, said loosening wedge pin being operable for driving said tightening wedge pin upwardly as said loosening wedge pin is driven further into said opening in said tightening wedge pin.

2. A clamp system as in claim 1, wherein said pressure bar comprises a v-shaped, inwardly facing bar.

3. A clamp system as in claim 1, wherein said wedge pin includes a v-shaped retainer at said lower end thereof for engaging said pressure bar.

* * * * *